United States Patent
Umeda (10) Patent No.: US 7,922,087 B2
(45) Date of Patent: Apr. 12, 2011

(54) IMAGE PROCESSING APPARATUS, IMAGE PROCESSING METHOD, AND COMPUTER PROGRAM STORED IN STORAGE MEDIUM

(75) Inventor: Ichiro Umeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 209 days.

(21) Appl. No.: 12/257,173

(22) Filed: Oct. 23, 2008

(65) Prior Publication Data
US 2009/0121024 A1 May 14, 2009

(30) Foreign Application Priority Data
Oct. 26, 2007 (JP) .................. 2007-278961

(51) Int. Cl.
G06K 7/10 (2006.01)
G06K 9/18 (2006.01)
G06K 9/32 (2006.01)
G06K 5/04 (2006.01)

(52) U.S. Cl. ......... 235/462.09; 235/462.01; 235/462.08; 235/462.14; 235/462.15; 235/462.2

(58) Field of Classification Search ............. 235/462.01, 235/462.08–462.1, 462.14–462.16
See application file for complete search history.

(56) References Cited

U.S. PATENT DOCUMENTS

| 5,691,527 | A | 11/1997 | Hara et al. | |
| 6,360,948 | B1* | 3/2002 | Yang et al. | 235/462.1 |
| 6,671,422 | B1 | 12/2003 | Nakanishi | |
| 6,863,218 | B2* | 3/2005 | Muramatsu | 235/462.25 |
| 7,546,950 | B2* | 6/2009 | Thiyagarajah | 235/462.09 |
| 7,648,072 | B2* | 1/2010 | Yada | 235/462.09 |
| 2002/0051573 | A1 | 5/2002 | Sakai et al. | |
| 2007/0071320 | A1* | 3/2007 | Yada | 382/181 |

* cited by examiner

*Primary Examiner* — Thien M. Le
*Assistant Examiner* — Tuyen K Vo
(74) *Attorney, Agent, or Firm* — Canon U.S.A., Inc. I.P. Division (57) ABSTRACT

When a two-dimensional code including a number of location symbols is detected from an image. First, a plurality of location symbols are detected from the image. Then, candidate location symbols are determined among the detected location symbols on the basis of sizes of the detected location symbols and distances between the detected location symbols. After that, a combination of location symbols constituting the two-dimensional code is detected among the candidate location symbols.

8 Claims, 7 Drawing Sheets

IMAGE PROCESSING APPARATUS, IMAGE PROCESSING METHOD, AND COMPUTER PROGRAM STORED IN STORAGE MEDIUM

BACKGROUND OF THE INVENTION

1. Field of the Invention

The present invention relates to an image processing method and an image processing apparatus arranged to detect a two-dimensional code from an image.

2. Description of the Related Art

As two-dimensional code detection methods, the following technologies in related art have been proposed.

U.S. Pat. No. 5,691,527 describes such a technology that an image is scanned in a certain direction, a signal of a symbol for the detection is detected on the basis of the scanning line signal pattern, and a two-dimensional code is detected from the image.

Also, US Patent Publication No. 2002/0051573 describes such a technology that an image is divided into a grid with blocks of M×N pixels, an area where blocks assumed to function as a two-dimensional code continuously exist is detected, and the area is extracted as a two-dimensional code area.

In addition, U.S. Pat. No. 6,671,422 describes such a technology that an image is divided into small areas, a small area with a high complexity is found on the basis of gray scale of the small areas, and a rough position of a two-dimensional code is determined.

According to the methods proposed in the related art, in a case where the two-dimensional code is rotated or a plurality of two-dimensional codes are included in the image, it is difficult to detect the symbol for the detection.

Also, according to the method of dividing the image into the small areas as described in U.S. Pat. No. 6,671,422, the size of a detected two-dimensional code relies on the size of the small area. Thus, it is difficult to detect the code in a case where two-dimensional codes with different sizes are included in the image.

SUMMARY OF THE INVENTION

According to an embodiment of the present invention, there is provided an image processing apparatus arranged to detect from an image a two-dimensional code including location symbols, the image processing apparatus including: a symbol detection unit arranged to detect a plurality of location symbols from the image; a determination unit arranged to determine candidate location symbols among the detected location symbols based on sizes of the detected location symbols and distances between the detected location symbols; and a combination detection unit arranged to detect a combination of location symbols constituting the two-dimensional code among the candidate location symbols.

According to the embodiment of the present invention, it is possible to detect one or more two-dimensional codes from the input image with a high accuracy. In particular, even when the rotation angles and the sizes of the plurality of QR codes included in the input image are varied, it is possible to detect the two-dimensional code with a high accuracy.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features of the invention and, together with the description, serve to explain the invention.

DESCRIPTION OF THE EMBODIMENTS

First Embodiment

Figure 7:
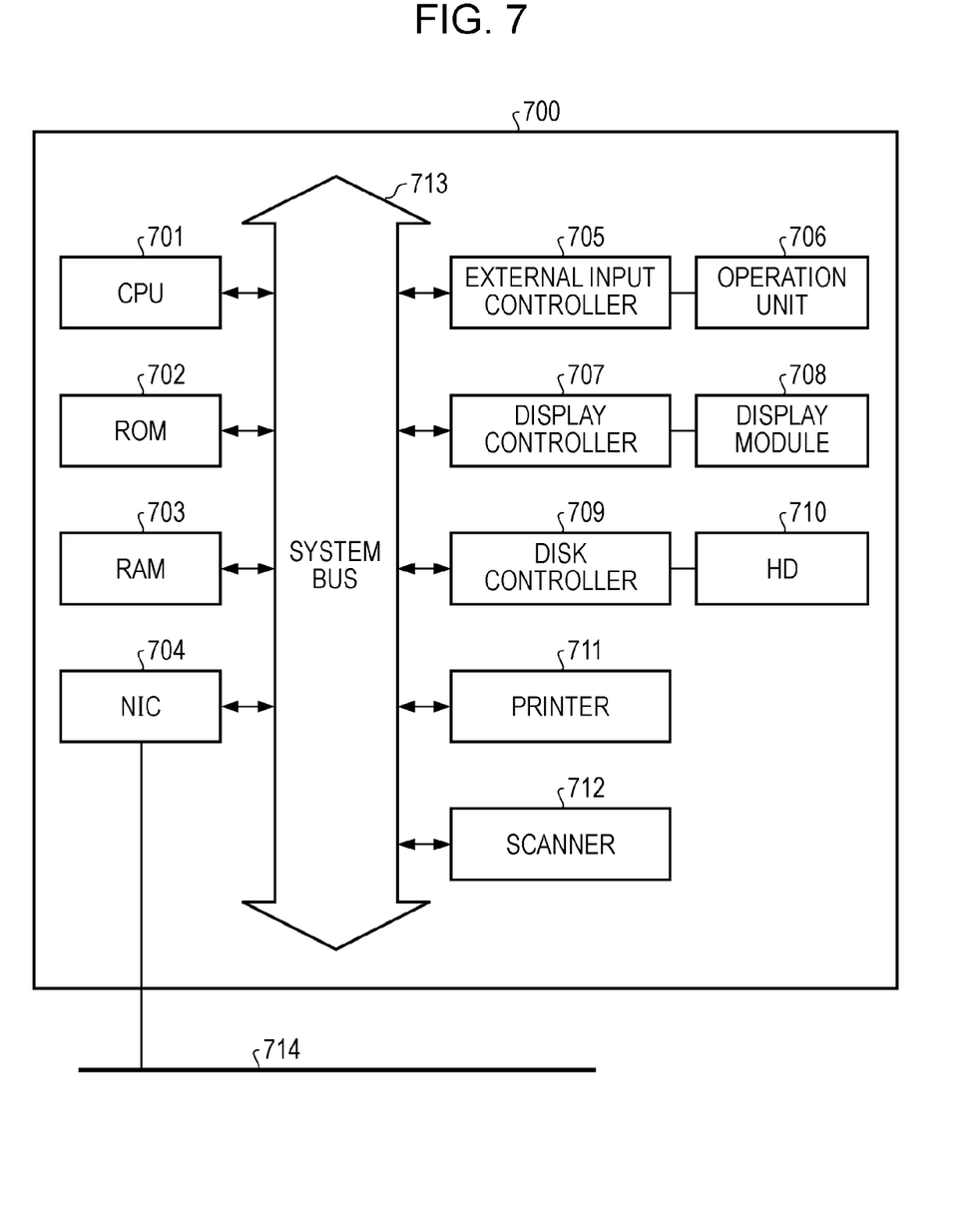
FIG. 7 illustrates an image processing apparatus according to a first embodiment of the present invention.

FIG. 7 is a block diagram of a configuration example of an image processing apparatus according to a first embodiment of the present invention.

In this drawing, an image processing apparatus 700 is provided with a CPU 701 for executing software stored in a ROM 702 or a large scale storage apparatus 710 such as a hard disk drive (HD). The CPU 701 controls the respective devices connected to a system bus 713 in an overall manner. That is, the ROM 702, a RAM 703, a network interface card 704, an external input controller 705, a display controller 707, the disk controller 709, a print unit 711, and an image reading unit 712 are connected to the system bus 713.

The RAM 703 functions as a main memory, a work area, or the like of the CPU 701. The network interface card 704 exchanges data with another network device, a file server, or the like via a LAN 714 in a bidirectional manner. The external input controller 705 controls an instruction input from an operation unit 706 composed of various buttons, a touch panel, or the like provided to the image processing apparatus. The display controller 707 controls a display of a display module (DISPLAY) 708 composed, for example, of a liquid crystal display.

The disk controller 709 controls accesses to the large scale storage apparatus 710. The large scale storage apparatus 710 may be used as an image temporary storage location in some cases. A printer 711 is realized, for example, by an electrophotography system, an ink jet system, or the like and performs a print on a sheet. A scanner 712 has a function of reading an image printed on the sheet. The image dealt with by the image processing apparatus according to the embodiment of the present invention may be an image read by the scanner 712, an image picked up by a digital camera, or an image input from another image input device.

The following processing is realized when the CPU 701 executes a computer program stored in a computer readable storage medium such as the ROM 702 or the large scale storage apparatus 710. The computer program allows a computer to function as the respective processing units (processing means) adapted to execute the following respective processing steps.

In addition, a configuration of the image processing apparatus according to the embodiment of the present invention is not limited to the configuration illustrated in FIG. 7. For example, the image processing apparatus may be composed of hardware such as electronic circuits and also may be realized by combining the processing performed by the hardware with the software processing by using the CPU.

Figure 2:
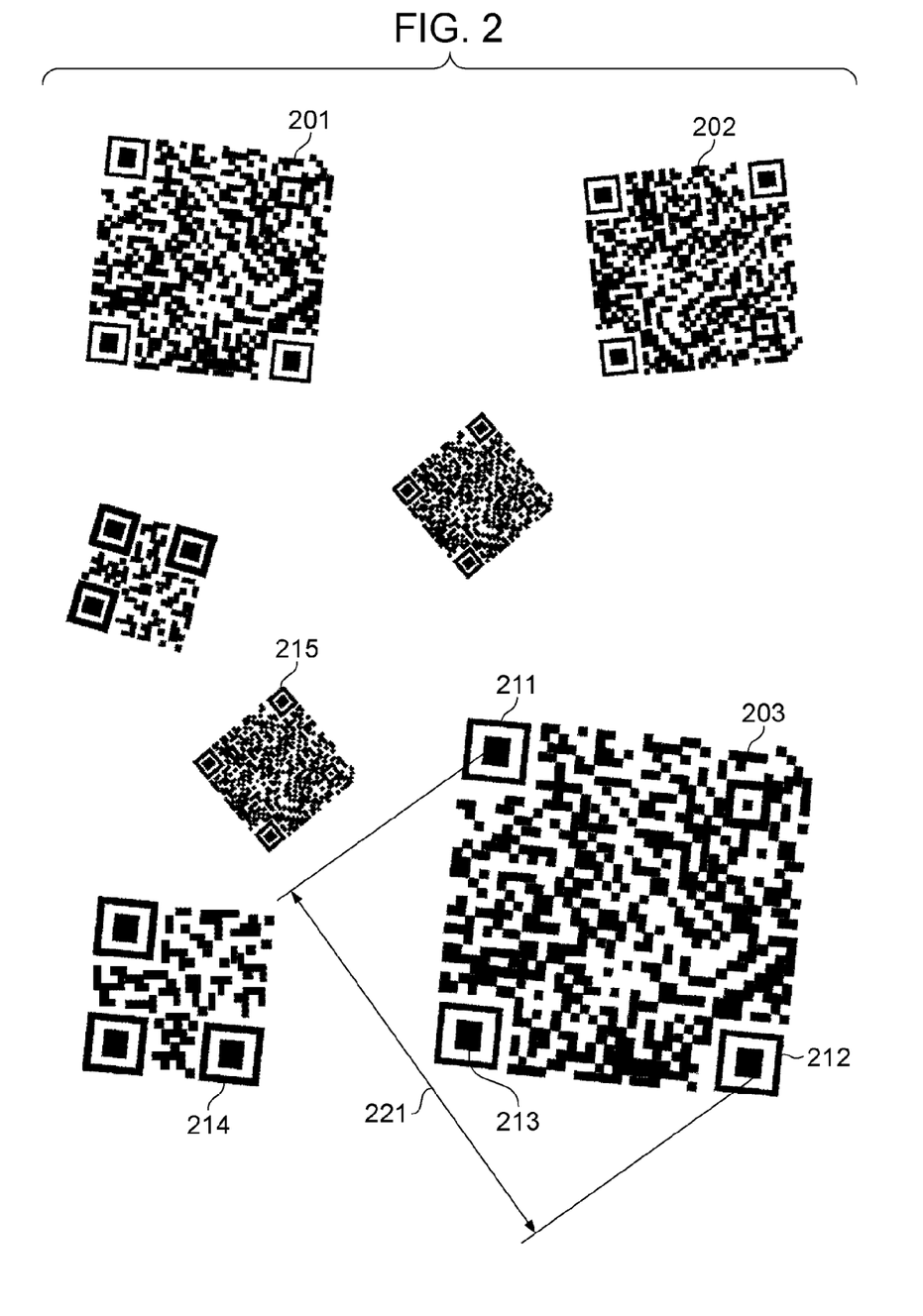
FIG. 2 illustrates an input image example including two-dimensional codes (QR codes).

FIG. 2 illustrates an input image example to be dealt with according to the present embodiment. The input image includes a plurality of two-dimensional code (for example, QR codes 201 to 203), and the angles and the size of the respective QR codes are different from one another. The respective QR codes includes three cutout symbols (location symbol: LS) for QR code detection. For example, location symbols of a QR code 203 in FIG. 2 correspond to parts 211, 212, and 213.

Figure 1:
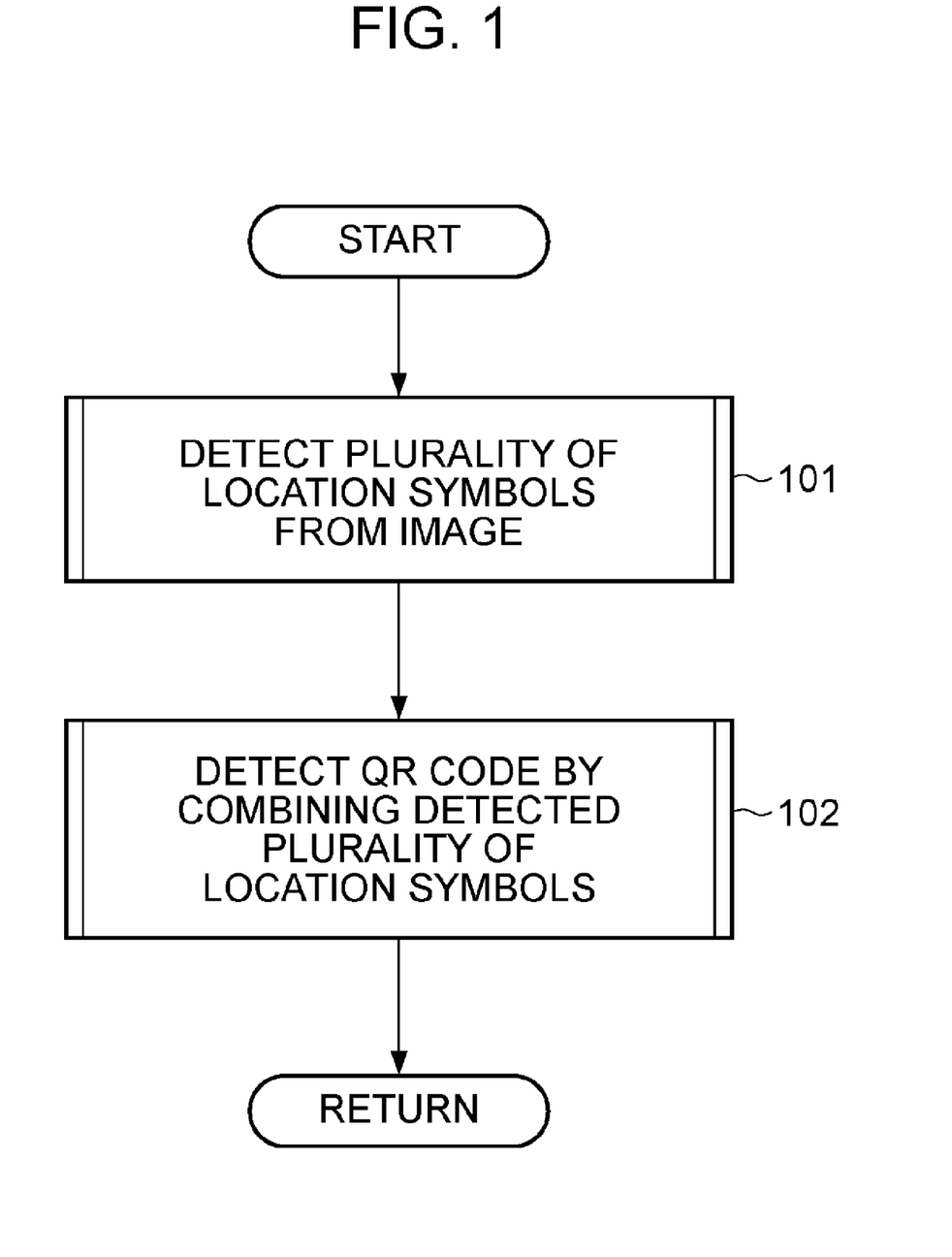
FIG. 1 is an entire flowchart for detecting a two-dimensional code.

FIG. 1 is a flowchart related to detection of the two-dimensional code. The image to be subjected to the processing in this case is a binary image. Therefore, in a case where a multi-value image is processed, a binarization processing is previously performed and the processing in the present flowchart is performed.

First, in step 101, a processing of detecting a plurality of location symbols (cutout symbols) from an image is executed.

Next, in step 102, a processing of detecting one or more QR codes from combinations of the plurality of location symbols in the image and outputting the detected QR code is executed.

Figure 3:
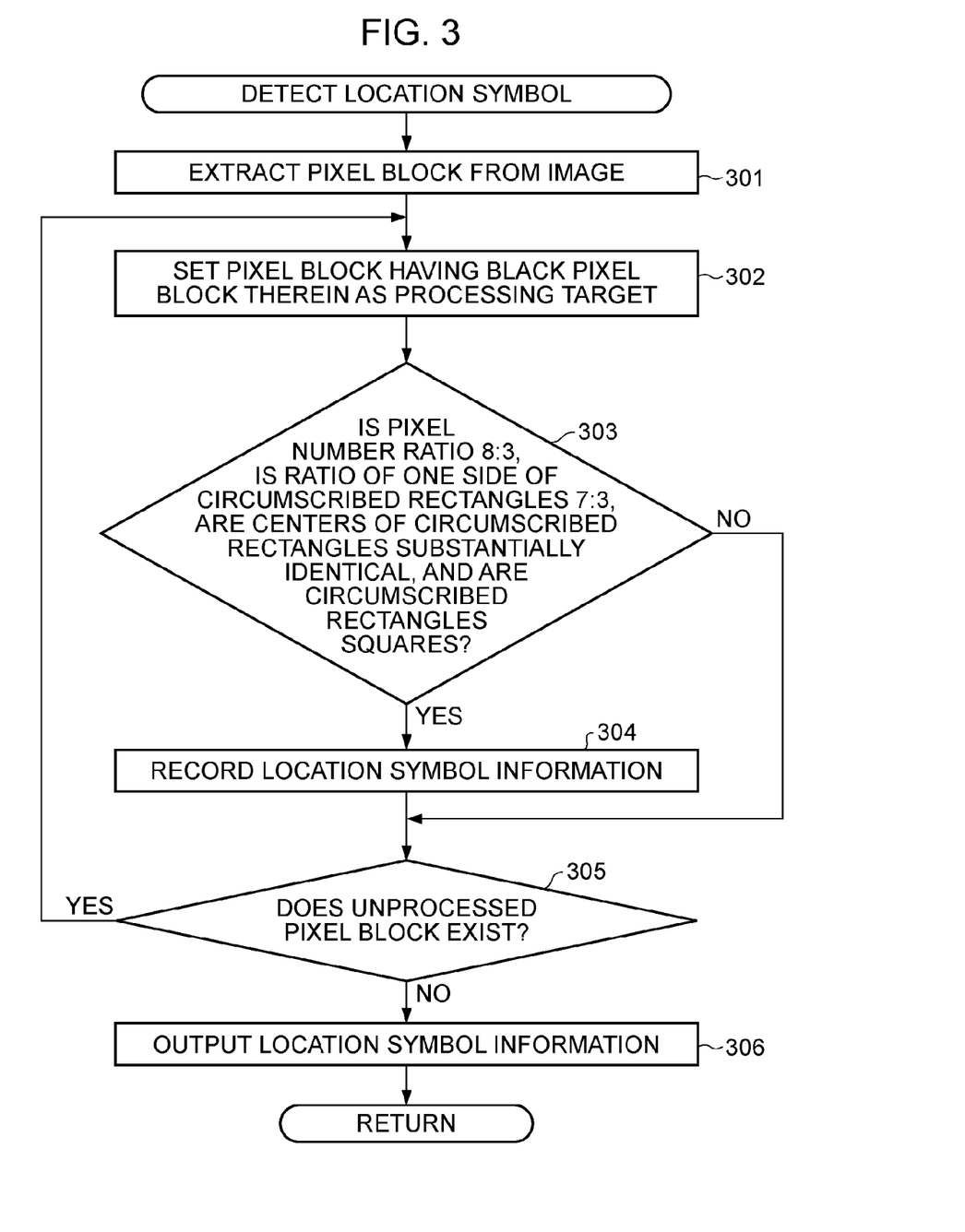
FIG. 3 is a flowchart related to detection of a location symbol.

A detail of step 101 in FIG. 1 will be described by using a flowchart of FIG. 3. In the flowchart of FIG. 3, a processing of detecting a plurality of location symbols from the input binary image to be output as a location symbol group is executed.

Figure 4:
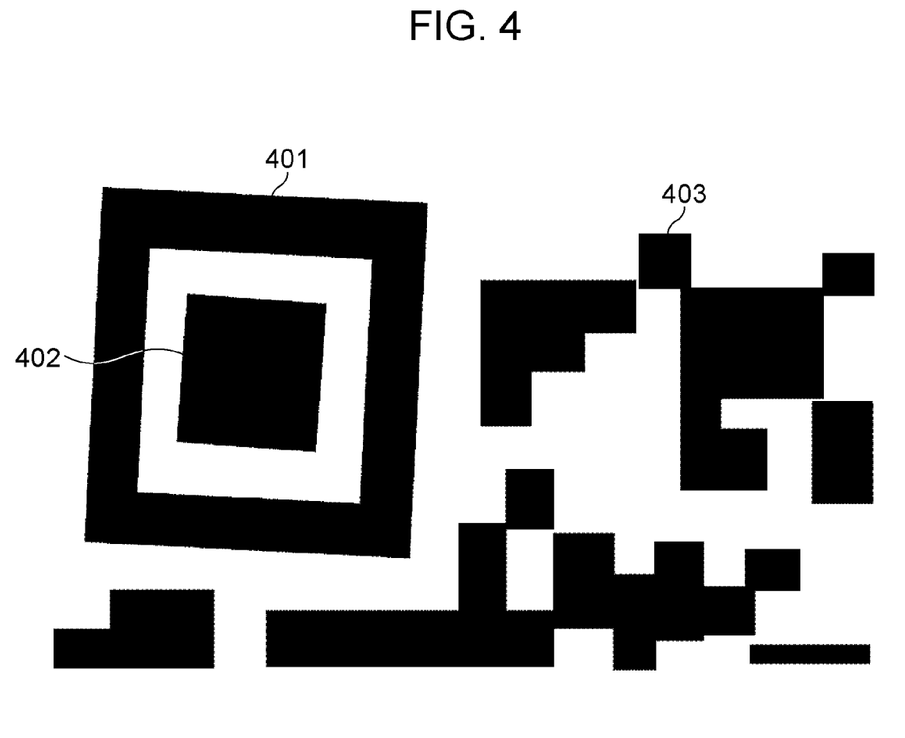
FIG. 4 is an expanded view around the location symbol.

Herein, FIG. 4 illustrates an expanded view around the location symbol 211 of FIG. 2, and a description will be provided by using FIG. 4.

In step 301, a black pixel block (black continuous pixel group) is extracted from the image. The extraction of the pixel block can be performed by using a related art technique such as a labeling method of adding a label to the black pixel to take out the pixel block or a contour tracing method of tracing and taking out a contour of the black pixel block. Herein, for example, black pixel blocks 401 and 403 and the like surrounded by white pixels are detected.

In step 302, among all the black pixel blocks detected in step 301, a pixel block having a white pixel block and another black pixel block inside the black pixel block is detected. Then, the processing in steps 303 and 304 is performed while setting the black pixel block having another black pixel block therein as the processing target. The processing in steps 303 and 304 is performed in turn on all the pixel blocks having another black pixel block therein. In FIG. 4, it is detected that the black pixel block 401 detected in step 301 has another black pixel block 402 therein, and thus, the black pixel block 401 is set as the processing target.

In step 303, regarding the outer pixel block and the inner pixel block, it is determined whether the pixel number ratio of both the pixel blocks is approximately 8:3, the ratio of one side of the respective circumscribed rectangles circumscribing the respective pixel blocks is approximately 7:3, the centers of the respective circumscribed rectangles circumscribing the respective pixel blocks are substantially identical, and the shape of the respective circumscribed rectangles circumscribing the respective pixel blocks is substantially square. In a case where all the above conditions are satisfied, the flow is advanced to step 304. In a case where all the above conditions are not satisfied, the flow is advanced to step 305. According to the present embodiment, approximately 8:3 means 8.1 to 7.9:3, and approximately 7:3 means 7.1 to 6.9:3. Also, substantially square means that the ratio of both the sides is 1.1 to 0.9:1. In this manner, when it is determined whether the conditions are satisfied, a permissible range for allowing an error may be set, (for example, 0.2). The permissible ranges (for example, 0.2) are tuning factors and determined by a designer at the time of designing. These permissible ranges may be determined, for example, on the basis of the scan resolution, or the like.

In step 304, the outer pixel block and the inner pixel block satisfying the conditions (in the example of FIG. 4, the pixel block 401 and the pixel block 402) are recoded as location symbols. Herein, the central coordinates and the sizes of the location symbols are recorded.

In step 305, it is determined whether among the pixel blocks having the other black pixel block therein, the pixel block on which the processing in steps 303 and 304 is not yet performed exists. In a case where the pixel block on which the processing in steps 303 and 304 is not yet performed exists, the flow is returned to step 302, and the processing in step 303 is performed while setting the pixel block on which the processing in steps 303 and 304 is not yet performed as the processing target. On the other hand, in a case where it is determined that the processing in steps 303 and 304 is performed on all the pixel blocks having the other black pixel block therein, the flow is advanced to step 306.

In step 306, the information of all the location symbols recorded in step 304 is output.

Figure 5:
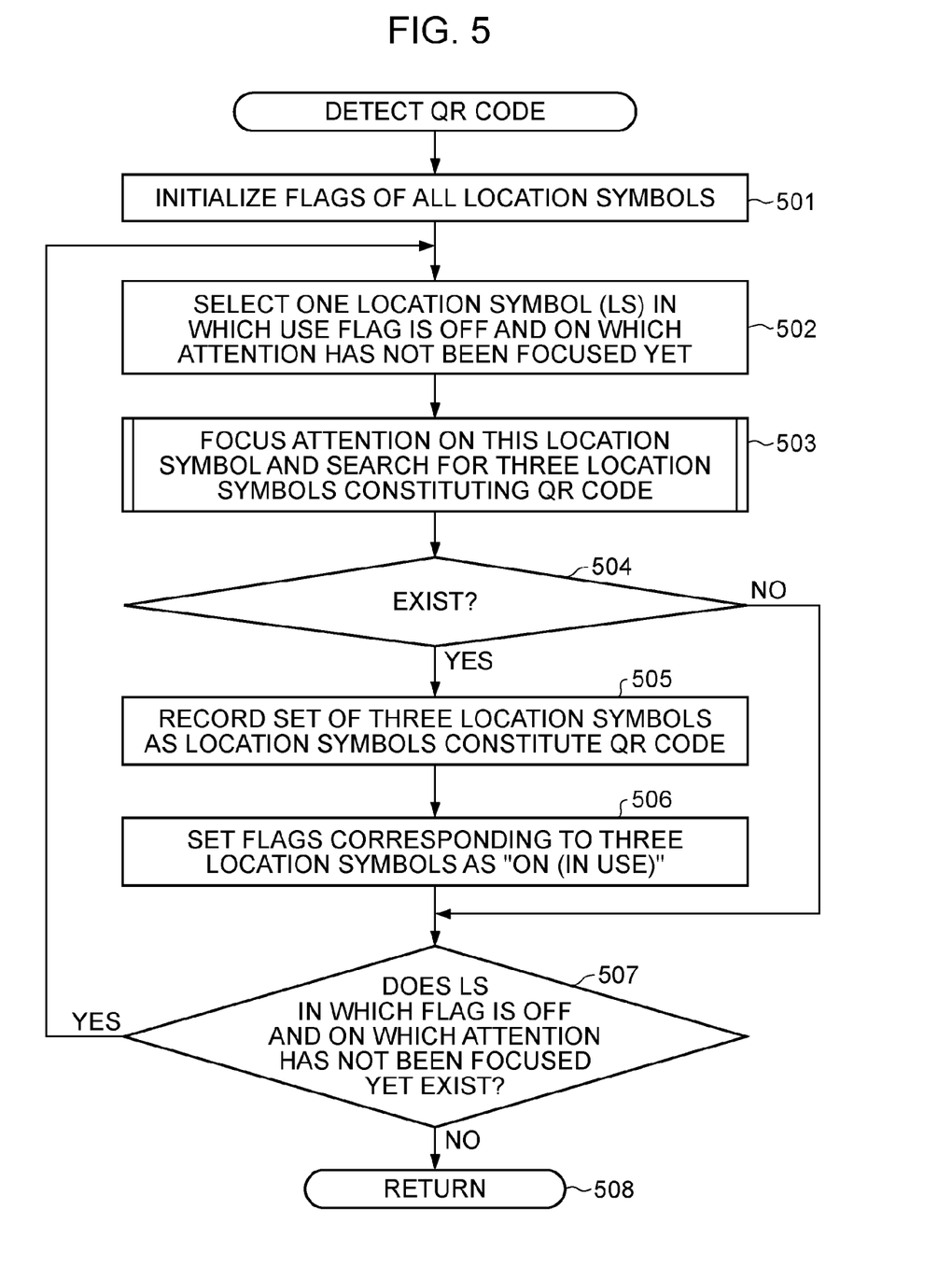
FIG. 5 is a flowchart related to a QR code detection.

A detail of step 102 in FIG. 1 is illustrated in FIG. 5. Herein, the location symbol information output in step 306 is received. On the basis of the location symbol information, the QR code is searched for and information related to the detected QR code is output.

Hereinafter, the information related to the location symbols 211 to 214 of FIG. 2 will be described as an example of the received location symbol information.

In step 501, the same number of flag areas as the received location symbol information pieces are secured, use flags are associated with all the location symbols, and all the use flags are initialized to "unused (OFF)".

In step 502, one location symbol arbitrarily selected from the location symbol information in which the use flag is OFF and on which attention has not been focused yet is set as attention target, and the processing in steps 503 to 508 is performed.

In step 503, while focusing attention on the attention location symbol on which the attention is focused in step 502, a nearby location symbol is searched for to find whether three location symbols constituting the QR code exist.

In step 504, as a result in step 503, it is determined whether the three location symbols constituting the QR code exist. When the three location symbols exist, the flow is advanced to step 505. When the three location symbols do not exist, the flow is advanced to step 507.

In step 505, the three location symbols detected in step 504 constitute the one QR code and the group of the location symbols is recorded.

In step 506, flags corresponding to the three location symbols are set as "in use (ON)".

For example, when the processing in step 503 is performed while focusing attention on the location symbol 211, the three location symbols 211 to 213 are searched as constituting the QR code 203. Then, the information on the group of the location symbols is recorded in step 505, and in step 506, the use flags corresponding to the location symbols 211 to 213 are set as "ON".

In step 507, it is determined whether the location symbol in which the use flag is OFF and also on which attention has not been focused yet (the unprocessed location symbol) exists. In a case where the unprocessed location symbol exists, the flow is returned to step 502, and in a case where the unprocessed location symbol does not exist, the flow is advanced to step 508.

In step 508, all the information on the QR code recorded in step 505 is output, and the process flow in FIG. 5 is ended.

Figure 6:
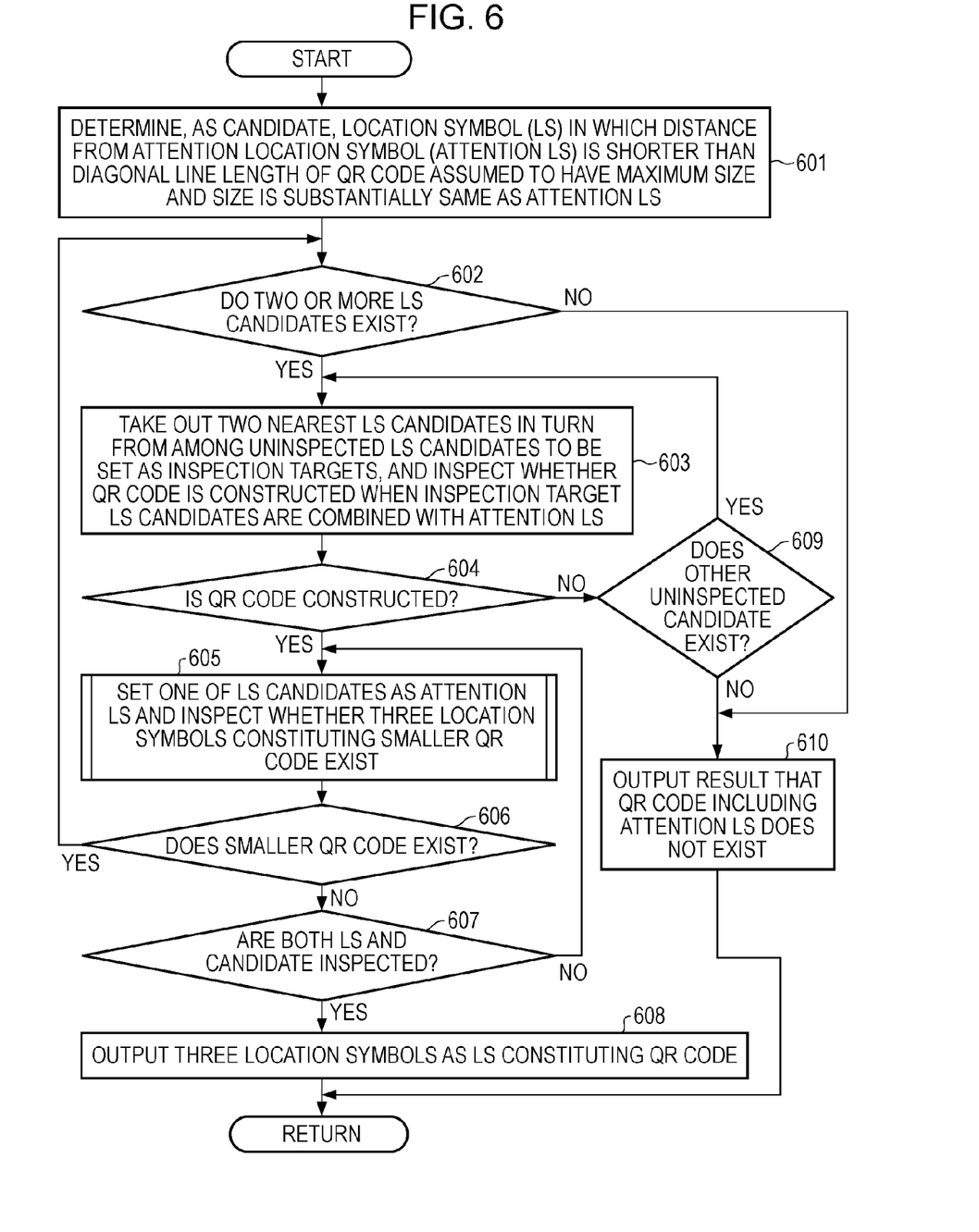
FIG. 6 is a flowchart related to a search for three location symbols constituting the QR code.

Next, FIG. 6 is a detailed flowchart of a search processing for the location symbols constituting the QR code in step 503 of FIG. 5.

In step 601, first, length information on a diagonal line of the QR code assumed to have the maximum size is obtained. Then, the location symbol in which the distance from the attention location symbol is shorter than the diagonal line length and also which has substantially the same size as the size of the attention location symbol is determined as a candidate of the location symbols constituting the QR code.

The length information on the diagonal line of the QR code assumed to have the maximum size can be obtained, for example, by obtaining the QR code assumed to have the maximum size on the basis of the size of the circumscribed rectangle of the attention location symbol, and calculating the length of the diagonal line of the QR code. According to the present embodiment, the size of the QR code with respect to the size of the location symbol is fixed by a specification, and thus, on the basis of the specification, the length of the maximum size diagonal line is calculated. The specification for the size of the QR code includes 21×21 cells to 177×177 cells. The location symbol has the size of 8×8 cells. Thus, the assumed length of the maximum size diagonal line can be obtained through (the length of one side of the location symbol)×177/8×√2. However, the embodiment of the present invention is not limited to the method of obtaining the length information on the diagonal line from the size of the location symbol in this manner. For example, a predetermined value may be used as the length of the diagonal line in a case where the size of the QR code included in the original of the processing target can be predicted in advance. For example, when the diagonal line length of the QR code used in the original of the processing target is previously determined as 4 cm or shorter, the predetermined value may be used.

As another example, in the original illustrated in FIG. 2, such a case is considered that the attention location symbol corresponds to the part 211, and the maximum size diagonal line length is denoted by reference numeral 221. In that case, among the plurality of location symbols 212 to 215, the location symbols in which the distance is shorter than the diagonal line length 221 and also the size is substantially the same are searched for and the location symbols 212, 213, and 214 become candidates.

In step 602, it is determined whether two or more location symbol candidates are found in step 601, and in a case where it is determined that two or more location symbol candidates are found, the flow is advanced to step 603. On the other hand, in a case where it is determined that two or more location symbol candidates do not exist, the flow is advanced to step 610.

In step 610, it is determined that the QR code including the attention location symbol does not exist, and the determination result (no QR code) is output.

In step 603, among uninspected location symbol candidates, the two nearest location symbol candidates are taken out as the inspection targets in turn, and it is inspected whether the QR code is constructed when the location symbol candidates of the inspection targets are combined with the attention location symbol. That is, among combinations of arbitrary two location symbol candidates, combinations nearest from the attention location symbol are sequentially set as the inspection targets to inspect whether the QR code is constructed. The inspections for judging whether the three location symbols (the attention location symbol and the two location symbol candidates of the inspection targets) can constitute the QR code are, for example, an inspection whether a shape connecting the three location symbols constitutes an isosceles right triangle and an inspection whether a black pixel block exists among the three location symbols. At this time, only in a case where both the answers are YES, the inspection result that the three location symbols can constitute the QR code is obtained. In addition, in order to increase the accuracy, an inspection whether recognition as the QR code can be possible may also be performed.

In step 604, in a case where it is determined that the three location symbols constitute the QR code, the flow is advanced to step 605. On the other hand, in a case where it is determined that the three location symbols do not constitute the QR code, the flow is advanced to step 609.

In step 609, it is determined whether another combination of uninspected location symbol candidates exists. In a case where it is determined that another combination exists, the flow is returned to step 603, and the next combination of the location symbol candidates is inspected. On the other hand, it is determined whether no other combination of uninspected location symbol candidates exists, the flow is advanced to step 610.

In step 605, one of the two location symbol candidates determined to constitute the QR code in step 604 is set as a new attention location symbol, and it is detected whether three location symbols constituting a QR code which is smaller than the detected QR code exist. That is, the processing in FIG. 6 is recursively performed on the new attention location symbol. Since this is the processing for detecting the smaller QR code, in step 601 recursively performed, location symbols in which the length of a one side is shorter than the length of the one side of the QR code previously detected and the size is substantially the same as the size of the new attention location symbol are set as the candidates. If the smaller QR code exists, in the recursively performed processing in FIG. 6, the three location symbols constituting the smaller QR code are output.

In step 606, it is determined whether the smaller QR code exists. In a case where it is determined that the smaller QR code exists, a combination of the two location symbol candidates is regarded as being inspected, and the flow is returned to step 602 to determine whether another combination of location symbol candidates exists.

On the other hand, in a case where it is determined that the smaller QR code does not exist, the flow is advanced to step 607. In step 607, it is determined whether the inspection in step 605 is performed on both the two location symbols candidates. In a case where the inspection is performed on both the two location symbols candidates, the flow is advanced to step 608. In a case where the inspection is not performed on both the two location symbols candidates, the other one is set as a new attention location symbol, and the flow is returned to the processing in step 605.

In step 608, as the location symbols constituting the QR code, combination information of the three location symbols (the attention location symbol and the location symbols candidates of the inspection targets) is output.

When the QR code recognition processing is performed on the QR code detected in this manner, the recognition result can be obtained.

As described above, according to the present embodiment, the plurality of location symbols (cutout symbols) are detected, and on the basis of the distance between the location symbols and the size of the location symbol, the combination of the location symbols constituting the QR code is detected. With this configuration, it is possible to detect the plurality of the QR codes from the input image even when the rotation angles and the sizes are different from one another.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-278961 filed Oct. 26, 2007, which is hereby incorporated by reference herein in its entirety.

What is claimed is:

1. An image processing apparatus arranged to detect from an image a two-dimensional code including location symbols, the image processing apparatus comprising:
   a symbol detection unit arranged to extract a plurality of black pixel blocks from the image and detect a plurality of location symbols satisfying a predetermined condition from the extracted black pixel blocks based on whether another black pixel block is included in the black pixel block, a pixel number ratio between the inner black pixel block and the outer black pixel block, shapes of circumscribed rectangles circumscribing each of the inner and outer black pixel blocks, a ratio of one side of the circumscribed rectangles, and centers of the circumscribed rectangles;
   a determination unit arranged to determine candidate location symbols from the detected location symbols based on sizes of the detected location symbols and distances between the detected location symbols; and
   a combination detection unit arranged to detect a combination of location symbols constituting the two-dimensional code from the candidate location symbols.

2. The image processing apparatus according to claim 1, wherein the determination unit focuses attention on one of the location symbols detected by the symbol detection unit and determines the attention location symbol and the candidate location symbols based on a size of the attention location symbol and distances of the detected location symbols from the attention location symbol.

3. The image processing apparatus according to claim 2, wherein the determination unit determines at least one candidate location symbol as being a location symbol whose size is substantially the same as the attention location symbol and also whose distance from the attention location symbol is shorter than a length of a diagonal line of the two-dimensional code of maximum size.

4. The image processing apparatus according to claim 1, wherein the two-dimensional code is a QR code.

5. An image processing apparatus for detecting a plurality of two-dimensional codes from an image, the image processing apparatus comprising:
   a symbol detection unit arranged to detect a plurality of location symbols from the image;
   a setting unit arranged to set one of the detected location symbols as an attention location symbol;
   a determination unit arranged to determine candidate location symbols from the detected location symbols based on a size of the attention location symbol and distances of the detected location symbols from the attention location symbol; and
   a combination detection unit arranged to detect a combination of location symbols constituting the two-dimensional code from the candidate location symbols by taking out two candidate location symbols nearest to the attention location symbol in turn from uninspected candidate location symbols as inspection targets and inspecting whether the attention location symbol and the inspection targets constitute the two-dimensional code.

6. The image processing apparatus according to claim 5, wherein the combination detection unit further determines whether one of the two candidate location symbols can constitute a smaller two-dimensional code with another candidate location symbol, and further inspects whether another two-dimensional code is constituted with the attention location symbol and second inspection targets which are took out from uninspected candidate location symbols in a case where it is determined that the one of the two candidate location symbols can constitute such smaller two-dimensional code.

7. An image processing method for detecting a plurality of two-dimensional codes from an image, the image processing method comprising:
   detecting a plurality of location symbols from the image;
   setting one of the detected location symbols as an attention location symbol;
   determining candidate location symbols from the detected location symbols based on a size of the attention location symbol and distances of the detected location symbols from the attention location symbol; and
   detecting a combination of location symbols constituting the two-dimensional code from the candidate location symbols by taking out two candidate location symbols nearest to the attention location symbol in turn from uninspected candidate location symbols as inspection targets and inspecting whether the attention location symbol and the inspection targets constitute the two-dimensional code.

8. A computer program stored in a computer-readable storage medium for detecting a plurality of two-dimensional codes from an image, the computer program including:
   program code that detects a plurality of location symbols from the image;
   program code that sets one of the detected location symbols as an attention location symbol;
   program code that determines candidate location symbols from the detected location symbols based on a size of the attention location symbol and distances of the detected location symbols from the attention location symbol; and
   program code that detects a combination of location symbols constituting the two-dimensional code from the candidate location symbols by taking out two candidate location symbols nearest to the attention location symbol in turn from uninspected candidate location symbols as inspection targets and inspecting whether the attention location symbol and the inspection targets constitute the two-dimensional code.

* * * * *